(12) United States Patent
Ecker

(10) Patent No.: US 6,786,684 B1
(45) Date of Patent: Sep. 7, 2004

(54) TUBULAR HOLE CUTTER

(76) Inventor: Robert J. Ecker, 128 Carriage Rd., Chicopee, MA (US) 01013

( * ) Notice: Subject to any disclaimer, the term of this patent is extended or adjusted under 35 U.S.C. 154(b) by 0 days.

(21) Appl. No.: 10/218,713

(22) Filed: Aug. 13, 2002

Related U.S. Application Data

(60) Provisional application No. 60/312,388, filed on Aug. 15, 2001.

(51) Int. Cl.[7] .............................................. B23B 51/04
(52) U.S. Cl. ....................................... 408/204; 408/207
(58) Field of Search ............................ 408/203.5, 204, 408/206, 207, 209, 703

(56) References Cited

U.S. PATENT DOCUMENTS

| | | | |
|---|---|---|---|
| 2,062,257 A | * 11/1936 | Douglas et al. | ............. 408/204 |
| 3,351,998 A | 11/1967 | Theiler | |
| 3,387,637 A | * 6/1968 | Ferguson et al. | ........... 408/204 |
| 3,430,526 A | 3/1969 | Valenziano | |
| 3,609,056 A | * 9/1971 | Hougen | ...................... 408/204 |
| 3,648,508 A | * 3/1972 | Hougen | ........................ 72/325 |
| 4,352,610 A | 10/1982 | Yankovoy et al. | |
| 4,408,935 A | * 10/1983 | Miyanaga | ................... 408/206 |
| 4,422,812 A | 12/1983 | Linville | |
| 4,490,080 A | * 12/1984 | Kezran | ........................ 408/112 |
| 4,616,965 A | 10/1986 | Anderson et al. | |
| 4,767,245 A | 8/1988 | Shoji et al. | |
| 5,314,270 A | 5/1994 | Lavanchy et al. | |
| 5,360,300 A | 11/1994 | Sullivan | |
| 5,417,526 A | 5/1995 | Stock et al. | |
| 5,451,128 A | 9/1995 | Hattersley | |
| 5,569,002 A | 10/1996 | Kleine | |
| 5,597,274 A | 1/1997 | Behner | |
| 5,733,074 A | 3/1998 | Stock et al. | |
| 5,803,677 A | 9/1998 | Brutscher et al. | |
| 5,813,802 A | 9/1998 | Ajimi et al. | |
| 6,152,661 A | 11/2000 | Thrasher | |

FOREIGN PATENT DOCUMENTS

| | | | | |
|---|---|---|---|---|
| DE | 263477 | * | 1/1989 | ................. 408/204 |
| GB | 2104808 | * | 3/1983 | ................. 408/204 |

* cited by examiner

*Primary Examiner*—Daniel W. Howell
(74) *Attorney, Agent, or Firm*—Donald S. Holland, Esq.; Holland & Bonzagni, P.C.

(57) ABSTRACT

A rotary, tubular hole cutter for quickly cutting holes through materials such as wood, fiberboard, and drywall. The device includes a tubular member with a backing plate attached to one end, with holes in the backing plate that enable the attachment of a conventional heavy-duty hole saw arbor. The device includes three equally spaced gullets, each of which has a cutting bit mounted adjacent to the trailing edge of the gullet, with the cutting face lying in the direction of rotation. The combination of three gullets and cutting bits, along with the cutting bit geometry, enable fast extraction of the "puck" or core from the tubular member after the cut is completed, by hand or other suitable device. The nature and aggressiveness of the cutting action is limited by the geometry of the cutting bits and their relationship to the top surface of the tubular member.

18 Claims, 2 Drawing Sheets

TUBULAR HOLE CUTTER

This application claims priority from a Provisional Application, Serial No. 60/312,388, filed Aug. 15, 2001.

FIELD

The present invention relates to tools, and, more specifically, to devices for cutting holes in wood and other construction materials.

BACKGROUND

Hole cutting devices for use in the construction trades typically consist of hole saws, auger bits, and spade-type bits. Several limitations are inherent in these traditional devices, such as cleanliness of cut, speed of cut, ability to cut large diameters with relatively low torque, and the ability to cut an interrupted or partial hole. Because of the proliferation of battery powered drilling devices, tools that cut large diameter holes without stalling or exceeding the torque capabilities of these devices have not been available. Also, as with rehabilitation construction, sometimes there are nails or screws hidden in the work piece that can fatally damage the saw or bit's cutting edge.

Previous attempts at solving these problems have been only marginally successful. For example, a hole saw shown in U.S. Pat. No. 5,803,677 to Brutscher et al. ("Brutscher") probably provides a fast cut, but the raker teeth provided on the hole saw add additional torque, and the hole saw, because of the number and placement of cutting teeth, does not offer an ideal load distribution and balance.

Further, in U.S. Pat. No. 5,597,274 to Behner ("Behner"), a hole cutter has a single cutting bit for reducing torque. However, the single-bit design adds to undesirable wobble and instability, as well as to a slower cutting speed.

Accordingly, a primary object of the present invention is to provide a tubular hole cutter that has an optimized cutting load distribution, and that offers a fast, low torque, clean cut, even for large-diameter and interrupted or partial holes.

SUMMARY

A tubular hole cutter comprises a tubular side wall and a circular backing plate attached to one end of the tubular side wall. The backing plate is configured for attachment to a conventional heavy-duty hole saw arbor. At an end opposite to the backing plate, the tubular side wall has a generally smooth, annular end surface interrupted by three gullets extending longitudinally in the side wall parallel to the axis of the hole cutter. The gullets are spaced equally about the circumference of the tubular side wall. Three cutting bits are attached to the tubular side wall at respective trailing edges of the gullets, i.e., spaced equally apart by 120°, with one cutting bit per gullet. This configuration allows the tubular hole cutter to place a maximum force, transferred to the object under the cutting edges, without binding the tool or resulting in an undesired angled offset hole. Additionally, the cutting bits are configured, according to a particular geometrical design, to produce a smooth, balanced, and precise cut, to reduce torque, and to reduce cutting bit wear, among other things.

In use, initially, the hole cutter is attached to a hole saw arbor, and the arbor is affixed to a drill or other power tool. The central pilot drill bit from the arbor engages the work piece to provide a stabilizing hole until the cutting bits engage the work piece. The outer edges of the cutting bits are configured to contact the work piece first, causing a scoring action that greatly reduces any rough surface at the entry and exit of the cut. This also creates a lip or flange on the exit side of the cutout, or "puck," that causes the puck to resist being drawn all the way into the hole cutter, thus allowing the puck to be more easily removed. During cutting the chips generated by the cutting bits are ejected into the gullets. Once the cutting operation is finished, the puck produced by the cut is then easily removed by hand or with a screwdriver or similar tool.

The multiple cutting bits share a reduced chip load resulting in lower cutting torque. The combination of multiple cutting bits, the shape of the bits, and the limitation of the depth-of-cut of the cutting bits by the annular end surface between the gullets provides a stable, low torque cut, even with larger diameters. This is especially desirable when using battery operated drilling devices.

When drilling an interrupted or partial (i.e., semi-circular) hole, the equally-spaced multiple bits facilitate continuous engagement with the work piece even when cutting with as little as about 52% of the surface diameter of the tubular hole cutter.

DETAILED DESCRIPTION

Figure 1:
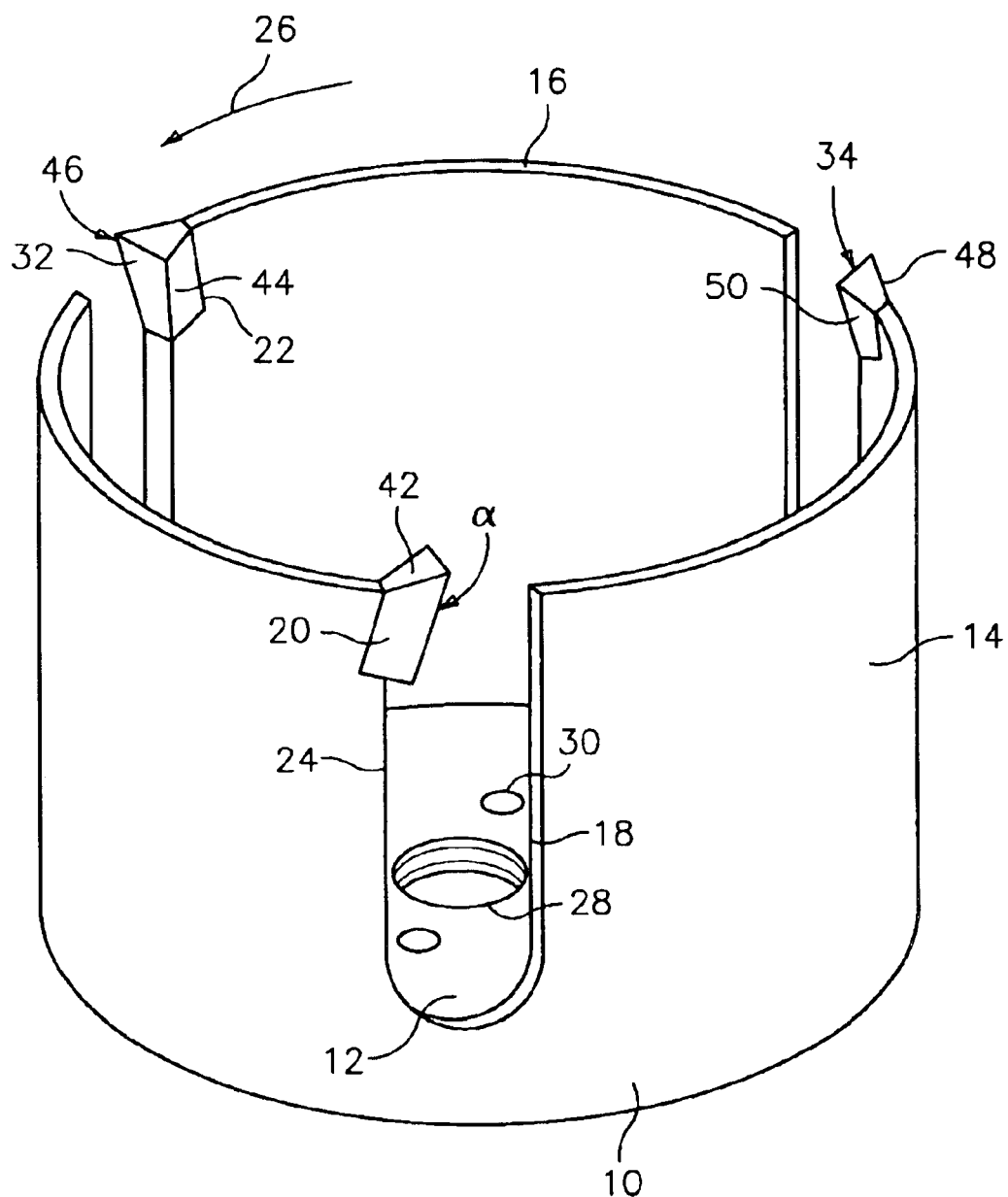
FIG. 1 is a perspective view of a tubular hole cutter, according to the present invention.
Figure 2A:
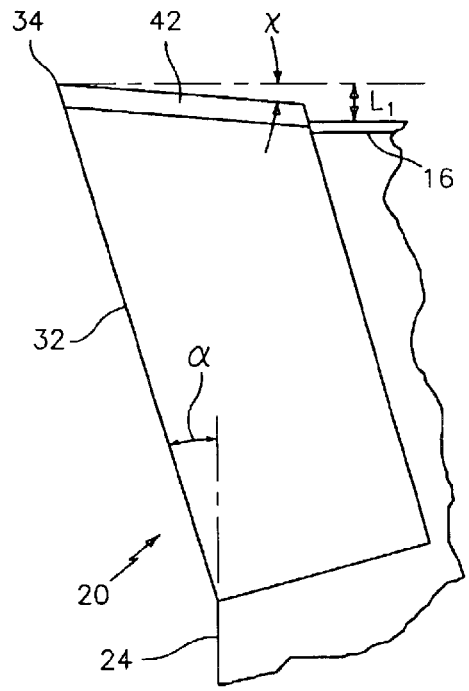
FIG. 2A is side elevation view of a cutting bit portion of the tubular hole cutter.
Figure 2B:
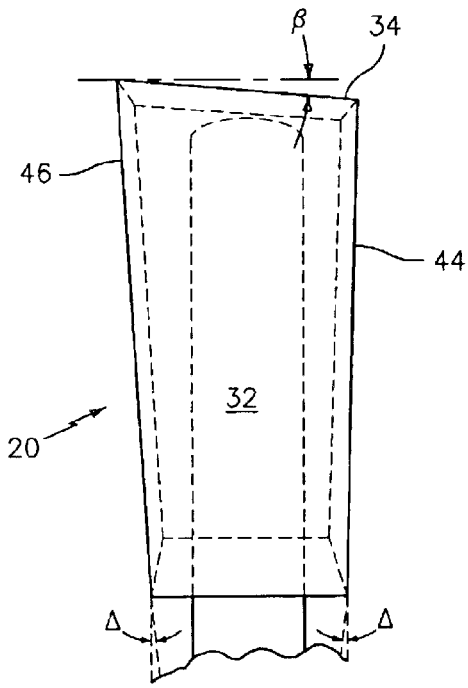
FIG. 2B is a front elevation view of the cutting bit shown in FIG. 2A.
Figure 2C:
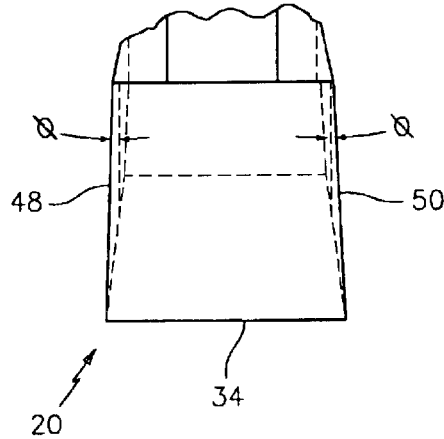
FIG. 2C is a top plan view of the cutting bit shown in FIG. 2A.

With reference to FIGS. 1–2C, a tubular hole cutter 10 according to the present invention comprises a circular backing plate 12 and an open-ended, tubular side wall 14 attached to the backing plate 12 at one end. At an end opposite to the backing plate, the tubular side wall 14 has a generally smooth, annular end surface 16 interrupted by three gullets 18 extending longitudinally in the side wall 14 parallel to the axis of the hole cutter 10. The gullets 18 are equally spaced about the circumference of the tubular side wall 14. Three cutting bits 20 are respectively attached to notches 22 in the gullet trailing edges 24, and are correspondingly spaced apart from one another by about 120°. This configuration allows the tubular hole cutter to place a maximum force, transferred to the object under the cutting edges, without binding the tool or resulting in an undesired angled offset hole. Thus, the present invention provides a reliable and safe cutting process by using the physics of triangulation to equally distribute the load about the tool circumference. Additionally, as discussed in more detail below, the cutting bits are configured to produce a smooth, balanced, and precise cut, to reduce torque, and to reduce cutting bit wear.

The tubular hole cutter 10 is meant to be turned in the counter clockwise direction of rotation 26 when viewed from the perspective of the open end of the tubular side wall 14.

The backing plate 12 is equipped with an attachment means, namely, a threaded, central hole 28 and at least two drive-pin holes 30, for attaching the hole cutter to a conventional heavy-duty hole saw arbor. More specifically, the tubular hole cutter 10 is for use in combination with a standard hole saw arbor (not shown), of the type typically having a pilot drill of sufficient length to extend longitudinally along the hole cutter's axis far enough to reach past the cutting bits 20. Such hole saw arbors are typically driven by a standard electrical drill or other suitable device.

FIGS. 2A–2C show the particular shape and configuration of the cutting bits in greater detail. The cutting bits are substantially identical to one another, i.e., they are identical within manufacturing tolerances. The cutting bits 20 are attached to the notches 22 in the gullet trailing edges 24 at an angle α (see FIG. 2A) that generally extends in the direction of rotation 26, i.e., cutting face portions 32 of the bits 20 are angled forward at a rake angle α to extend past the gullet trailing edges. In a preferred embodiment, the rake angle a extends from 0.0 degrees to 45.0 degrees, with the preferred angle for cutting wood being at about 15.0 degrees, to control the amount to shear of wood (i.e., the amount of shear on the bit).

Further, each cutting bit 20 terminates at a cutting edge 34. The cutting edge 34 extends longitudinally beyond the annular end 16 of the tubular side wall 14 by a distance $L_1$ of at least 0.005 inches (0.013 cm), with a preferred embodiment extending between 0.010 and 0.020 inches (0.025 to 0.051 cm), to control the depth of penetration into the work piece and to also reduce torque.

Figure 3:
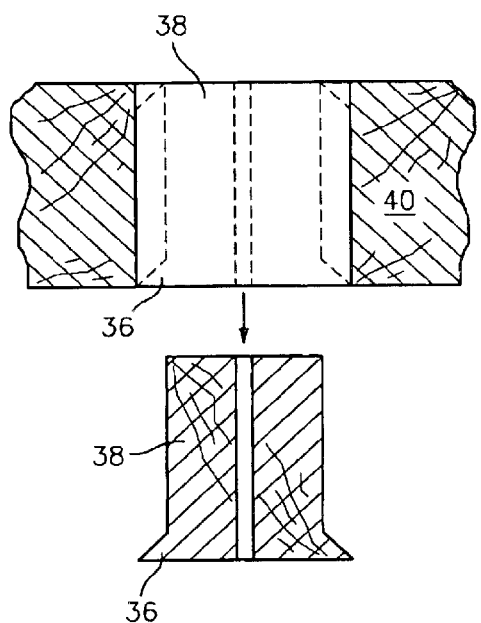
FIG. 3 is a schematic, cross-sectional view of a work piece and a cutout or "puck" produced by cutting a hole through the work piece with the tubular hole cutter.

The cutting edge 34 also has a top bevel grind (see FIG. 2B) descending in the direction from the outer diameter of the tubular side wall 14 towards the center of the tubular side wall 14. The top bevel grind is angled at an angle β of between 0.0 degrees to 45.0 degrees, with a preferred embodiment being angled by β=5.0 degrees, to create a score at the circumference for a cleaner cut hole. With reference to FIG. 3, this also creates a lip or flange 36 on the exit side of the "puck" 38 (the cutout portion of the work piece 40) to prevent it from being drawn all the way into the cutting device, thereby facilitating its easy removal.

The cutting bits 20 also have a back clearance or top relief 42 extending from the cutting edge 34 back toward the gullet trailing edge 24 at an angle χ of 0.0 degrees to 45.0 degrees, with a preferred embodiment having a top relief of χ=5.0 degrees, to control the speed of the penetration of the cut.

The cutting bits 20 also have side clearances or reliefs 44, 46, each with a minimum angle Δ of 2.0 degrees, to reduce friction, torque, and side wear of the cutting bits. It should be noted that the side reliefs do not necessarily have to be angled the same.

Further, the cutting bits 20 have an "outer" radial relief 48 (see FIG. 2C) extending from the outer edge of the bit cutting face 32 to the outer surface of the tubular side wall 14 (or thereabouts), and an "inner" radial relief 50 extending from the inner edge of the bit cutting face 32 to the inner surface of the tubular side wall 14 (or thereabouts). Each radial relief 48, 50 is angled at a minimum angle φ of 3.0 degrees to reduce torque and corner wear. Again, the radial reliefs can be angled differently from each other.

The tubular side wall 14 is made from steel generally 0.100 inches (0.254 cm) in thickness. The cutting bits 20 are slightly wider, generally about 3/16 inches (0.476 cm) in width, allowing for the cutting edge 34 to cut a path larger than the width of the end surface 16 of the side wall 14. Additionally, the side wall 14 is of sufficient depth to enable the hole cutter 10 to cut through a significant thickness of wood or construction material. Generally, this would represent a cut depth of about 2¼ inches (6 cm) typically encountered in most construction and rehabilitation settings.

The gullets 18 are each about 0.5 inch (1.3 cm) wide. This has been found to provide a good balance between having enough space for ejecting cut chips and structural and operational stability.

In use, initially, the hole cutter 10 is attached to an arbor and drill. The central pilot drill from the arbor first engages the work piece to provide a stabilizing hole until the cutting bits 20 engage the work piece. The outer edges of the cutting bits 20 (i.e., the radially-outermost portions of cutting edges 34) contact the work piece first, causing a scoring action that greatly reduces any rough surface at the entry and exit of the cut. This also creates the lip or flange 36 on the exit side of the "puck" or "slug" 38 that causes the puck to resist being drawn all the way into the hole cutter 10, thus allowing the puck to be more easily removed. The chips generated by the cutting bits are ejected into the gullets.

The multiple cutting bits 20 share a reduced chip load resulting in lower cutting torque. The combination of multiple cutting bits and the limitation of the depth-of-cut of the cutting bits by the annular end surface 16 between the gullets provides a stable, low torque cut, even with larger diameters. This is especially desirable when using battery operated drilling devices.

Once the cutting operation is finished, the puck or slug produced by the cut is then easily removed by hand, or by using a screwdriver or other suitable device in any of the multiple gullets or combination thereof.

The three cutting bits 20, spaced equally apart by 120 degrees, in conjunction with the particular shape and positioning of the cutting bits 20, provide significant performance advantages over prior art hole cutters. These advantages include:

optimized cutting load distribution;

lower friction and required torque load (from 10 to 30 percent lower than standard hole saws), facilitating use with battery powered drills;

faster, cleaner cuts;

longer tool life, including reduced side wear and corner wear;

the ability to cut through small metal objects (e.g., screws, nails), hidden in a work piece, without damage;

enhanced safety because of low torque and less fatigue;

easy puck extraction by hand or with a tool; and when drilling an interrupted or partial hole, the equal spacing of the multiple bits facilitates engagement with the work piece, even when cutting as low as approximately 52% of the surface diameter of the device.

To further illustrate these advantages, a 4 inch (10 cm) diameter version of the present invention was tested against a standard 4 inch diameter hole saw, i.e., of the type having a tubular side wall or member that terminates at an annular ring of contiguous cutting teeth (see FIG. 1 in Brutscher). The same electric drill was used to cut holes into a wood panel using the two bits. Results were tabulated by tracking the electrical current (in amps) drawn by the drill during the cutting procedure. Results are given in the table below:

| STAGE OF CUTTING OPERATION | CURRENT DRAWN BY DRILL USING PRIOR ART HOLE SAW (AMPERES) | CURRENT DRAWN BY DRILL USING PRESENT INVENTION (AMPERES) |
|---|---|---|
| No load | 1.4 A | 1.4 A |
| Full load, approximate minimum draw | 4.1 A | 2.3 A |

| STAGE OF CUTTING OPERATION | CURRENT DRAWN BY DRILL USING PRIOR ART HOLE SAW (AMPERES) | CURRENT DRAWN BY DRILL USING PRESENT INVENTION (AMPERES) |
|---|---|---|
| Full load, approximate maximum draw | 6.9 A | 4.3 A |

As should be appreciated, these results show that when using the same drill to cut into the same wood, a hole saw according to the present invention draws significantly less current than a standard prior art hole saw.

The numerical ranges set forth above for the various cutting bit features (e.g., 25 the cutting edge 34 extending longitudinally beyond side wall by a distance $L_1$ of at least 0.005 inches) have been experimentally and/or theoretically validated as being suitable for bringing about the various, respective functions associated therewith (e.g., controlling penetration depth and reducing torque). Additionally, optimum values or ranges (e.g., $L_1$=between 0.010 and 0.020 inches) have been experimentally and/or theoretically validated as optimizing said functions.

The cutting bits 20 have been illustrated as single piece, generally trapezoidal solids (i.e., slightly irregular, six-sided solids, with each side being generally planar and having four edges). However, other overall bit shapes are possible, e.g., curved sides, provided they supply some or all of the various reliefs, extensions, rake angles, etc., according to the present invention, as set forth above and in the claims.

Although the tubular hole cutter of the present invention has been illustrated for use with a conventional hole saw arbor, one of ordinary skill in the art will appreciate that the tubular hole cutter could be configured for use without an arbor, or it could be provided with its own, "built in" arbor (i.e., a forwards extending drill bit attached to the center of the backing plate and coaxial with the tubular side wall, and corresponding shank extending rearwards from the backing plate).

Since certain changes may be made in the above-described tubular hole cutter, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A tubular hole cutter comprising:
   a. a backing plate;
   b. a tubular side wall attached to the backing plate and having a generally smooth, annular end surface opposite said backing plate, wherein the annular end surface is interrupted by three generally longitudinal gullets in the tubular side wall, said gullets being equally spaced about the circumference of the tubular side wall; and
   c. three cutting bits attached to the tubular side wall at respective trailing edges of said gullets, wherein the cutting bits: (i) extend past the trailing edges of the gullets in the direction of rotation of the tubular hole cutter; (ii) extend longitudinally past said annular end surface; and (iii) each have: a rake angle; a top relief; two side reliefs; and two radial reliefs, to provide a balanced, clean cut in a work piece.

2. A tubular hole cutter comprising:
   a. a backing plate;
   b. a tubular side wall attached to the backing plate and having a generally-smooth, annular end surface opposite said backing plate, wherein the annular end surface is interrupted by three generally longitudinal gullets in the tubular side wall, said gullets being equally spaced about the circumference of the tubular side wall and each having a maximum width of about 0.5 inch; and
   c. three cutting bits attached to the tubular side wall at respective trailing edges of said gullets, wherein the cutting bits: (i) extend past the trailing edges of the gullets in the direction of rotation of the tubular hole cutter; (ii) extend longitudinally past said annular end surface; and (iii) each have: a rake angle; a top relief; two radial reliefs; two side reliefs each angled by at least 2.0 degrees; and a top bevel grind descending in the direction from an outer diameter of the tubular side wall toward the center of the tubular side wall, said top bevel grind being adapted in size and shape to create a lip or flange on a cutout portion of a work piece being cut with the tubular hole cutter, to prevent the cutout portion from being completely drawn down into the tubular side wall during cutting, thereby allowing a user of the tubular hole cutter to remove the cutout portion from the tubular side wall by hand.

3. The tubular hole cutter of claim 2 wherein the radial reliefs of each cutting bit are angled by at least 3.0 degrees.

4. The tubular hole cutter of claim 2 wherein the top relief of each cutting bit is angled by about 5.0 degrees.

5. The tubular hole cutter of claim 2 wherein the cutting bits extend longitudinally past said annular end surface by about 0.010 to 0.020 inches.

6. The tubular hole cutter of claim 2 wherein the rake angle of each cutting bit is about 15.0 degrees.

7. A tubular hole cutter comprising:
   a. a backing plate;
   b. a tubular side wall attached to the backing plate and having a generally smooth, annular end surface opposite said backing plate, wherein the annular end surface is interrupted by three generally longitudinal gullets in the tubular side wall, said gullets being equally spaced about the circumference of the tubular side wall; and
   c. three cutting bits attached to the tubular side wall at respective trailing edes of said gullets, wherein the cutting bits: (i) extend past the trailing edges of the gullets in the direction of rotation of the tubular hole cutter; (ii) extend longitudinally past said annular end surface by about 0.010 to 0.020 inches; and (iii) each have: a rake angle of 15.0 degrees; a top relief; two side reliefs; and to radial reliefs, to provide a balanced, clean cut in a work piece.

8. The tubular hole cutter of claim 7 wherein the radial reliefs of each cutting bit are angled by at least 3.0 degrees.

9. The tubular hole cutter of claim 8 wherein the top relief of each cutting bit is angled by about 5.0 degrees.

10. The tubular hole cutter of claim 9 wherein the side reliefs of each cutting bit are angled by at least 2.0 degrees.

11. The tubular hole cutter of claim 6 wherein the radial reliefs of each cutting bit are angled by at least 3.0 degrees.

12. The tubular hole cutter of claim 11 wherein the top relief of each cutting bit is angled by about 5.0 degrees.

13. The tubular hole cutter of claim 12 wherein the cutting bits extend longitudinally past said annular end surface by about 0.010 to 0.020 inches.

14. A tubular hole cutter comprising:
a. a tubular side wall terminated at one end by a backing plate and at the other end by a generally smooth annular end surface, said tubular side wall defining three generally longitudinal gullets that are equally spaced about the circumference of the tubular side wall; and
b. three substantially identical cutting bits attached to the tubular side wall at respective trailing edges of the three gullets, wherein each of the cutting bits is a single piece, generally trapezoidal solid, wherein
c. the cutting bits extend longitudinally past the annular end surface by about 0.010 to 0.020 inches for controlling penetration depth and reducing torque; and
d. each cutting bit comprises a generally trapezoidal solid having:
    (i) a rake angle of about 15.0 degrees for controlling the amount of shear on the bit;
    (ii) two radial reliefs each angled by at least 3.0 degrees for reducing torque and corner wear;
    (iii) a top relief angled by about 5.0 degrees for controlling penetration speed;
    (iv) two side reliefs each angled by at least 2.0 degrees for reducing friction, torque, and side wear; and
    (v) a top bevel grind, descending in the direction from an outer diameter of the tubular side wall toward the center of the tubular side wall, for creating a lip or flange on a cutout portion of a work piece being cut with the tubular hole cutter, to prevent the cutout portion from being completely drawn down into the tubular side wall during cutting.

15. A tubular hole cutter comprising:
a. a backing plate;
b. a tubular side wall attached to the backing plate and having a generally smooth, annular end surface opposite said backing plate, wherein the annular end surface is interrupted by three generally longitudinal gullets in the tubular side wall, said gullets being equally spaced about the circumference of the tubular side wall; and
c. three cutting bits attached to the tubular side wall at respective trailing edges of said gullets, wherein the cutting bits: (i) extend past the trailing edges of the gullets in the direction of rotation of the tubular hole cutter; (ii) extend longitudinally past said annular end surface; (iii) each have a top bevel grind descending in the direction from an outer diameter of the tubular side wall toward the center of the tubular side wall, said top bevel grind being adapted in size and shape to create a lip or flange on a cutout portion of the work piece being cut with the tubular hole cutter, to prevent the cutout portion from being completely drawn down into the tubular side wall during cutting; (iv) each have a rake angle of about 15.0 degrees; and (v) each have a radial relief angled by at least 3.0 degrees.

16. The tubular hole cutter of claim 15 wherein each cutting bit has a top relief angled by about 5.0 degrees.

17. The tubular hole cutter of claim 16 wherein each cutting bit has two side reliefs, each of said two side reliefs being angled by at least 2.0 degrees.

18. The tubular hole cutter of claim 17 wherein the cutting bits extend longitudinally past said annular end surface by about 0.010 to 0.020 inches.

* * * * *

UNITED STATES PATENT AND TRADEMARK OFFICE
CERTIFICATE OF CORRECTION

PATENT NO. : 6,786,684 B1 Page 1 of 1
DATED : September 7, 2004
INVENTOR(S) : Robert J. Ecker It is certified that error appears in the above-identified patent and that said Letters Patent is hereby corrected as shown below:

Column 3,
Line 17, change "a" to -- α --.

Column 6,
Line 52, after "angle of" insert -- about --.
Line 53, change "to" to -- two --.

Signed and Sealed this

Twenty-sixth Day of October, 2004

JON W. DUDAS
*Director of the United States Patent and Trademark Office*